United States Patent
Yoshida et al.

(10) Patent No.: US 6,341,194 B1
(45) Date of Patent: Jan. 22, 2002

(54) VIDEO SIGNAL TRANSMISSION APPARATUS

(75) Inventors: Teruyuki Yoshida; Shosuke Tanaka, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/614,637

(22) Filed: Jul. 12, 2000

Related U.S. Application Data

(63) Continuation of application No. 08/793,857, filed as application No. PCT/JP96/01822 on Jul. 1, 1996, now Pat. No. 6,104,859.

(30) Foreign Application Priority Data

Jun. 29, 1995 (JP) .......................................... P7-184993

(51) Int. Cl.[7] ................................................ H04N 5/76
(52) U.S. Cl. .......................................... 386/80; 386/81
(58) Field of Search .............................. 386/46, 68, 80, 386/81, 82, 111, 112, 124, 125, 126; 369/60; H04N 5/76

(56) References Cited

U.S. PATENT DOCUMENTS

| | | | | | |
|---|---|---|---|---|---|
| 4,985,784 | A | * | 1/1991 | Tsuboi et al. | 386/126 |
| 5,432,769 | A | * | 7/1995 | Honjo | 369/60 |
| 5,666,460 | A | * | 9/1997 | Ohta et al. | 386/82 |
| 5,721,815 | A | * | 2/1998 | Ottensen et al. | 725/1 |
| 5,754,729 | A | * | 5/1998 | Fujinami | 386/124 |
| 6,104,859 | A | * | 8/2000 | Yoshida et al. | 386/80 |

* cited by examiner

Primary Examiner—Huy Nguyen
(74) Attorney, Agent, or Firm—Frommer Lawrence & Haug LLP; William S. Frommer; Dennis M. Smid

(57) ABSTRACT

This invention is directed to a video signal transmitting/receiving apparatus adapted for converting a series of video signals into picture data in predetermined block units to send out it to a transmission path in the asynchronous transfer mode to thereby transmit a first video material formed by the series of video signals to transmission object, and adapted for receiving picture data inputted in the predetermined block units by the asynchronous transfer mode through the transmission path to convert it into a series of video signals to thereby receive a second video material formed by the series of video signals transmitted from transmission object. In this apparatus, an approach is employed to once record a series of digital video signals onto the prescribed video signal recording medium thereafter to intermittently reproduce those digital video signals to send out them to the transmission path of the asynchronous transfer mode, or an approach is employed to record a series of data received from the transmission path of the asynchronous transfer mode onto the recording medium to output those data, thus allowing digital video signals of the synchronous transfer system to undergo transmission by way of the transmission path of the asynchronous transfer mode such as B-ISDN, etc. Thus, video materials are caused to undergo transmission/reception through the transmission path of this kind to have ability of improving the working efficiency.

9 Claims, 8 Drawing Sheets

RECEIVING SYSTEM MEMORY CONTROL
OF INTERFACE 3

DATA RECORDER 6 RECEIVING
SYSTEM TAPE CONTROL

VIDEO SIGNAL TRANSMISSION APPARATUS

This is a continuation of application Ser. No. 08/793,857 filed Feb. 27, 1997, now U.S. Pat. No. 6,104,859 which is a 371 of PCT/JP96/01822 filed Jul. 1, 1996.

TECHNICAL FIELD

This invention relates to a video signal transmission apparatus adapted for allowing digital video signals to undergo transmission through a data recorder, etc. to thereby have ability of transmitting/receiving video material (data) of the synchronous transfer system through a transmission path by ATM (Asynchronous Transfer Mode) such as B-ISDN (Broad band aspect of Integrated Services Digital Network), etc.

BACKGROUND ART

Hitherto, in transmission of news material (data) of the broadcasting station, etc., because emergency is required, from a viewpoint such that adherence to high picture quality (mainly in the case of analog transmission; picture compression is used by the requirements based on the transmission band in the case of the digital transmission) is not particularly made, video materials photographed or image-picked up at the photographing field (site) are transmitted directly or after undergone editing, through channels of SNG (Satellite News Gathering). By employing such a transmission system, times required for delivery (transfer) of video materials of this kind are shortened, so improvement in the working efficiency has been made.

On the contrary, digital video materials such as (video) materials collected (gathered) in the drama, etc., which require high picture quality, require high transfer rate. In the case of production house, etc. which cannot ensure channels of SNG, as shown in FIG. 8, these digital video materials are recorded onto a magnetic tape to carry convey this magnetic tape to thereby carry out delivery (transfer) of video material.

Meanwhile, also in such production house, etc., if delivery of video materials can be made by using communication line, the time required for delivery is shortened accordingly. Thus, the working efficiency can be improved.

As one method thereof, a method in which B-ISDN which is one of public lines which can be easily utilized even in the production house of this kind is used to carry out transmission of video materials of this kind is conceivable.

However, the transmission system of the video material applied to (transmission equipment within) the production house, etc. is the synchronous transfer system in which video signals are caused to undergo transmission (transmitted) without break on real time basis, whereas in the case of the transmission system by B-ISDN, data are caused to undergo transmission (transmitted) by the asynchronous transfer mode for intermittently transmitting data with respective cells being as unit. There is great difference therebetween in respect of the above-mentioned point. Accordingly, in the case of the transmission system by B-ISDN, there was the problem that it is impossible to easily carry out transmission of video materials of this kind.

Further problem is that the fact that the transfer rate of video materials of this kind is greatly different from the transfer rate of B-ISDN also makes it difficult or impossible to easily carry out transmission of video materials of this kind.

This invention has been made in view of the above-mentioned problems, and its object is to provide a video signal transmission apparatus capable of transmitting/receiving video materials by the synchronous transfer system by using the transmission path by the asynchronous transfer mode.

DISCLOSURE OF THE INVENTION

A video signal transmitting/receiving apparatus is directed to a video signal transmitting/receiving apparatus adapted for converting a series of video signals into picture data in predetermined block units to send out it to a transmission path in the asynchronous transfer mode to thereby transmit a first video material formed by the series of video signals to transmission object (object which is subject to transmission), and adapted for receiving picture data inputted in the predetermined block units by the asynchronous transfer mode through the transmission path to convert it into a series of video signals to receive a second video material formed by the series of video signals transmitted from transmission object, the apparatus comprising: recording/reproduction means for recording or reproducing the first or second video material with respect to (i.e., onto or from) a recording medium; memory means for storing the first video material outputted from the recording/reproduction means or the second video material inputted through the transmission path; and control means for monitoring memory (storage) speed when the first or second video material to be stored into the memory means is (actually) stored thereinto, and for monitoring remaining capacity of the memory means, whereby in the case where the remaining capacity of the memory means is less than a predetermined value when the first video material is transmitted from the memory means to the transmission path, the control means outputs, to the recording/reproduction means, a control signal in which reproduction speed of the recording/reproduction means is designated along with a control signal for controlling the recording/reproduction means to allow it to reproduce the first video material recorded on the recording medium, and in the case where the remaining capacity of the memory means is less than the predetermined value when the second video material is stored into the memory means from the transmission path, the control means outputs, to the recording/reproduction means, a control signal in which recording speed of the recording/reproducing means is designated along with a control signal for allowing the memory means to output therefrom the second video material stored therein to allow the recording/reproduction means to record it.

Moreover, a video signal transmitting apparatus according to this invention is directed to a video signal transmitting apparatus adapted for converting a series of video signals into picture data in predetermined block units to send out it to a transmission path in the asynchronous transfer mode to thereby transmit a video material formed by the series of video signals to transmission object, the apparatus comprising: recording/reproduction means for recording or reproducing the video material with respect to (i.e., onto or from) a recording medium; memory means for storing the video material outputted from the recording/reproduction means; and control means for monitoring memory (storage) speed of the video material stored in the memory means, and for monitoring remaining capacity of the memory means, whereby in the case where the remaining capacity of the memory means is less than a predetermined value when the video material is transmitted from the memory means to the transmission path, the control means outputs, to the recording/reproduction means, a control signal in which reproduction speed of the recording/reproduction means is designated along with a control signal for controlling the recording/reproduction means to allow it to reproduce the video material recorded on the recording medium.

Further, a video signal receiving apparatus according to this invention is directed to a video signal receiving apparatus adapted for receiving picture data inputted in predetermined block units by the asynchronous transfer mode through a transmission path to convert it into a series of video signals to thereby receive a video material formed by the series of video signals transmitted from transmission object, the apparatus comprising: recording/reproduction means for recording or reproducing the video material with respect to (i.e., onto or from) a recording medium; memory means for storing the video material inputted through the transmission path; and control means for monitoring memory (storage) speed of the video material stored in the memory means, and for monitoring remaining capacity of the memory means, whereby in the case where the remaining capacity of the memory means is less than a predetermined value when the video material is stored into the memory means from the transmission path, the control means outputs, to the recording/reproduction means, a control signal in which recording speed of the recording/reproduction means is designated along with a control signal for allowing the memory means to output therefrom the video material stored therein to allow the recording/reproduction means to record it.

Further, a video signal transmitting/receiving method according to this invention is directed to a video signal transmitting/receiving method of converting a series of video signals into picture data in predetermined block units to send out it to a transmission path in the asynchronous transfer mode to thereby transmit a first video material formed by the series of video signals to transmission object, and of receiving picture data inputted in the predetermined block units by the asynchronous transfer mode through the transmission path to convert it into a series of video signals to thereby receive a second video material formed by the series of video signals transmitted from transmission object, the method comprising: a first step of recording or reproducing the first or second video material with respect to (i.e., onto or from) a recording medium; a second step of storing, into memory means, the first video material reproduced from the recording medium or the second video material inputted through the transmission path; and a third step of monitoring memory (storage) speed when the first or second video material to be stored into the memory means is (actually) stored thereinto, and monitoring remaining capacity of the memory means, whereby in the case where the remaining capacity of the memory means is less than a predetermined value, such a control is conducted to allow the recording/reproduction means to reproduce the first video material recorded on the recording medium at a reproduction speed corresponding to the memory speed, and in the case where the remaining capacity of the memory means is less than the predetermined value when the second video material is stored into the memory means from the transmission path, such a control is conducted to allow the recording/reproduction means to record, onto the recording medium, the second video material stored in the memory means at a recording speed corresponding to the memory speed.

Further, a video signal transmitting method according to this invention is directed to a video signal transmitting method of converting a series of video signals into picture data in predetermined block units to send out it to a transmission path in the asynchronous transfer mode to thereby transmit a video material formed by the series of video signals to transmission object, the method comprising: a first step of recording or reproducing the video material with respect to (i.e., onto or from) a recording medium; a second step of allowing memory means to store thereinto the video material reproduced from the recording medium; and a third step of monitoring memory (storage) speed when the video material to be stored into the memory means is (actually) stored thereinto, and monitoring remaining capacity of the memory means, whereby in the case where the remaining capacity of the memory means is less than a predetermined value when the video material is transmitted from the memory means to the transmission path, such a control is conducted to allow the recording/reproduction means to reproduce the video material recorded on the recording medium at a reproduction speed corresponding to the memory speed.

Further, a video signal receiving method according to this invention is directed to a video signal receiving method of receiving picture data inputted in predetermined block units by the asynchronous transfer mode through a transmission path to convert it into a series of video signals to thereby receive a video material formed by the series of video signals transmitted from transmission object, the method comprising: a first step of recording or reproducing the video material with respect to (i.e., onto or from) a recording medium; a second step of allowing memory means to store thereinto the video material inputted through the transmission path; and a third step of monitoring memory (storage) speed when the video material to be stored into the memory means is (actually) stored thereinto, and monitoring remaining capacity of the memory means, whereby in the case where the remaining capacity of the memory means is less than a predetermined value when the video material is stored into the memory means from the transmission path, such a control is conducted to allow the recording/reproduction means to record the video material onto the recording medium at a recording speed corresponding to the memory speed.

Thus, in accordance with the invention respectively featured as above, when applied to a video signal transmission apparatus adapted for sending out a series of video signals to the transmission path by the asynchronous transfer mode to transmit video material to the transmission object, and adapted for receiving picture data inputted by the asynchronous transfer mode through the transmission path to receive video material, thus to transmit the video material, such a transmission system is employed to record a series of video signals onto the video signal recording medium thereafter to intermittently reproduce the video signal recording medium in dependency upon empty state of the transmission path to convert reproduction signals obtained by the reproduction into picture data of the previously prescribed block units to transmit it to the transmission object, thereby making it possible to send out video signals inputted by the synchronous transfer system, e.g., in cell units in correspondence with circumstances of the transmission path. Moreover; also in the case where the sending-out speed of cell varies, this transmission system can cope with such a case. Further, when such a transmission system is employed, in receiving video material, to record video signals obtained from the previously described picture (video) data onto the previously described video signal recording medium thereafter to reproduce, when, with respect to a series of video signals, reception of picture data corresponding thereto is completed, the recorded series of video signals and to output them, even in the case where, in reception of picture data intermittently transmitted by the asynchronous transfer mode, the time interval of the picture data intermittently obtained (i.e., cell data) is varied, this transmission system can cope with such case.

Further, at this time, if the previously described video signals are caused to be digital video signals by the prescribed format, the video signals can be caused to undergo recording/reproduction by the data recorder.

Furthermore, at this time, if the previously described video signal recording medium is caused to be comprised of magnetic tape, e.g., data recorder adapted for recording/reproducing digital video signals by the prescribed interface is used, thus making it possible to record/reproduce the video signals.

In addition, in place of the above, if such a transmission system is employed to input/output picture data from and to the previously described transmission path through the prescribed buffer memory to change recording speed or reproduction speed of the video signal recording medium in correspondence with input/output of the previously described picture data from the buffer memory, it is possible to finely cope with change of time intervals of respective cells, etc.

BEST MODE FOR CARRYING OUT THE INVENTION

Preferred embodiments of this invention will now be described in detail suitably with reference to the attached drawings.

Figure 1:
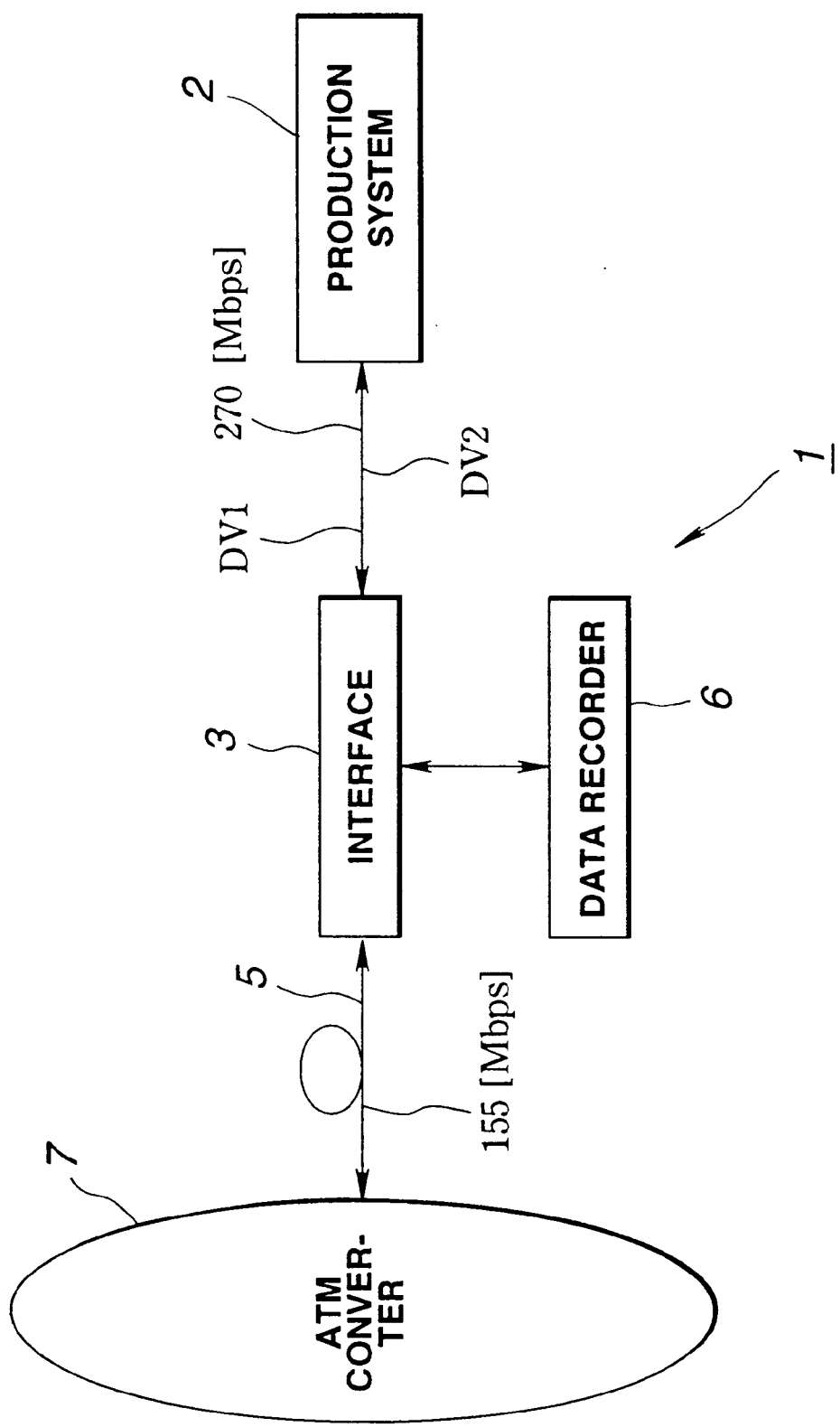
FIG. 1 is a block diagram showing a video material transmission system according to an embodiment of this invention.

FIG. 1 shows a video material transmission system according to an embodiment of this invention. A digital video signal DV1 sent out from a production system 2 is transmitted to transmission object (object which is subject to transmission) through an interface circuit 3. In a manner opposite to the above, a digital video signal DV2 transmitted from the transmission object through the interface circuit 3 is transmitted to the production system 2.

Namely, the production system 2 serves to output, to the interface circuit 3, video material consisting of digital video signal DV1 by the serial interface prescribed (specified) by SMPTE (Society of Motion Picture and Television Engineers) standard 259M, and to input digital video signal DV2 outputted from the interface circuit 3 by the format similar to the above. Thus, the production system 2 carries out input/output of digital video signals DV1 and DV2 which are serial data at a transfer rate (speed) of 270 [M bps] through the interface circuit 3 to carry out transmission/reception of video material between the production system and the transmission object.

The interface circuit 3 divides digital video signal DV1 inputted from the production system 2 into blocks of the fundamental transfer units prescribed by B-ISDN thereafter to add headers for exchange(switch) transmission to the respective blocks. Thus, the digital video signal DV1 is converted into cells prescribed by B-ISDN. The cells thus obtained are sent out to a transmission path 5.

When this digital video signal DV1 is sent out to the transmission path 5, the interface circuit 3 outputs, to a data recorder 6, the digital video signal DV1 inputted from the production system 2. The digital video signal DV1 thus outputted is once recorded onto a magnetic tape loaded within the data recorder 6. Further, the interface circuit 3 controls the operation of the data recorder 6 in dependency upon circumstances of the transmission path 5, etc. to take out the recorded digital video signal DV1 from the data recorder 6 to send out it. Thus, the interface 3 can send out the digital video signal DV1 inputted by the synchronous transfer system to the transmission path 5 based on the asynchronous transfer mode.

Further, the interface circuit 3 monitors headers of respective cells inputted through the transmission path 5 to selectively input self-designation cell. Thus, the interface circuit 3 receives digital video signal DV2 transmitted from the transmission object, thus making it possible to output the digital video signal DV2 thus received to the production system 2.

At this time, the interface circuit 3 controls the operation of the data recorder 6 to record data of the cell taken thereinto by the data recorder 6 to reproduce, when input from the transmission path 5 is completed with respect to a series of video material (data), the recorded data by the data recorder 6 to output the reproduced data thus obtained to the production system 2. Thus, the interface circuit 3 can output, to the production system 2, by the synchronous transfer system, the digital video signal DV2 inputted in the asynchronous transfer mode from the transmission path 5.

As described above, the data recorder 6 is controlled by the interface circuit 3 to switch the operation of the recording/reproduction system to record, onto the magnetic tape, digital video signals DV1, DV2 inputted from the interface circuit 3, and to reproduce the digital video signals DV1, DV2 from the magnetic tape to output them to the interface circuit 3.

Between the interface circuit 3 and an ATM switch 7, data is subjected to transmission at a transmission rate (speed) of 155 [M bps] which is the fundamental bit rate of B-ISDN connected by the transmission path 5. The ATM switch 7 executes processing for the terminal switching connection with headers of respective cells inputted from the transmission path being as reference.

Figure 2:
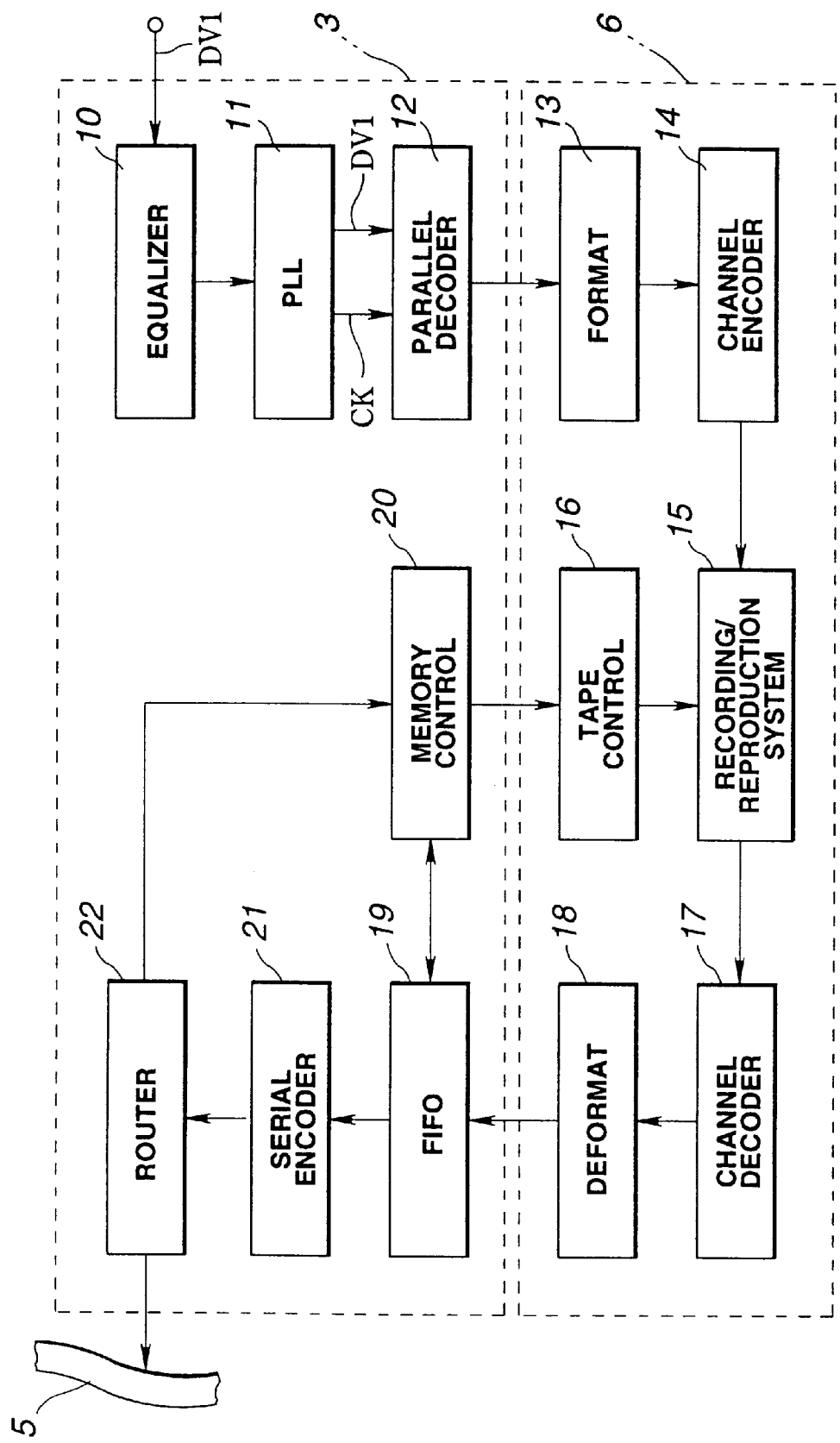
FIG. 2 is a block diagram showing transmitting system of the video material transmission system of FIG. 1.

FIG. 2 is a block diagram showing the transmitting system of the video material transmission system 1. In the interface circuit 3, an equalizer 10 receives digital video signal DV1 inputted through coaxial cable to output it after undergone correction of the characteristic deterioration resulting from transmission loss through the coaxial cable.

A PLL (Phase Locked Loop) circuit 11 generates a clock CK from the digital video signal DV1 outputted from the equalizer 10 to output the digital video signal DV1 and the clock CK. A parallel decoder 12 converts the digital video signal DV1 consisting of serial data into parallel data with the clock CK being as reference to output the digital video signal in the parallel data form to the data recorder 6.

The data recorder 6 is adapted to receive the digital video signal converted into the parallel data by a format circuit 13. This format circuit 13 converts this digital video signal into the prescribed (specified) data structure in accordance with the logical format of the data recorder 6 to output it. A channel encoder 14 allows output data of the format circuit 13 to undergo channel coding to add error correction code thereto. Further, the channel encoder 14 subsequently executes processing such as shuffling, etc. to execute the prescribed encoding processing. Thus, the data recorder 6 converts the digital video signal DV1 inputted in the form of parallel data into recording data train suitable for recording/reproduction of the magnetic tape to input the recording data train to a recording/reproduction system 15.

The recording/reproduction system 15 successively obliquely forms recording tracks on the magnetic tape to record recording data outputted from the channel encoder 14 onto the magnetic tape. Thus, the digital video signal DV1 sent to the transmission object is once recorded onto the magnetic tape. Further, the recording/reproduction system 15 is controlled by the tape control circuit 16 to rewind the magnetic tape up to the recording starting position when it has completed recording of the digital video signal DV1 to subsequently start reproduction of the magnetic tape.

In this reproduction, the recording/reproduction system 15 is controlled by the tape control circuit 16 so that the reproducing operation is temporarily stopped. Thus, digital video signals recorded on the magnetic tape are intermittently sent out. Further, the recording/reproduction system 15 is similarly controlled by the tape control circuit 16 to vary magnetic tape traveling speed while allowing the rotational speed of the rotary drum and the traveling speed of the magnetic tape to have a predetermined relationship therebetween in this reproduction to thereby vary reproduction speed while holding the relative speed between the rotary drum and the magnetic tape at a fixed value to thereby vary the data transfer rate (speed) of the reproduced digital video signal DV1 as occasion demands.

A channel decoder 17 amplifies reproduction signal obtained from the magnetic head to correct the frequency characteristic, etc. thereafter to convert such reproduction signal into serial data. Further, the channel decoder 17 allows the serial data to undergo decoding processing thereafter to implement deshuffling processing thereto to subsequently implement error correction processing thereto thereafter to carry out channel decoding. Thus, the channel decoder 17 reproduces input data of the channel encoder 14. A deformat circuit 18 processes output data of the channel decoder 17 in a manner opposite to the format circuit 13 to thereby output digital video signal consisting of parallel data inputted to the data recorder 6.

In the interface circuit, a FIFO (First In First Out) 19 stores the digital video signal outputted from the deformat circuit 18, and is controlled by a memory control circuit 20 to output data stored therein to thereby form buffer memory of the interface circuit 3. A serial encoder 21 converts parallel digital video signal outputted from the FIFO 19 into serial digital video signal to output it.

A router 22 divides output data of the serial encoder 21 into blocks consisting of fundamental transfer units prescribed by B-ISDN thereafter to add heads for exchange (switch) transmission to respective blocks to convert the digital video signal DV1 into cells prescribed by B-ISDN. Further, the router 22 sends out data of cells at the timings in which sending-out operations of cells are permitted while monitoring the transmission path 5. Thus, the video material transmission system 1 can send out the video material to the transmission object.

Figure 3:
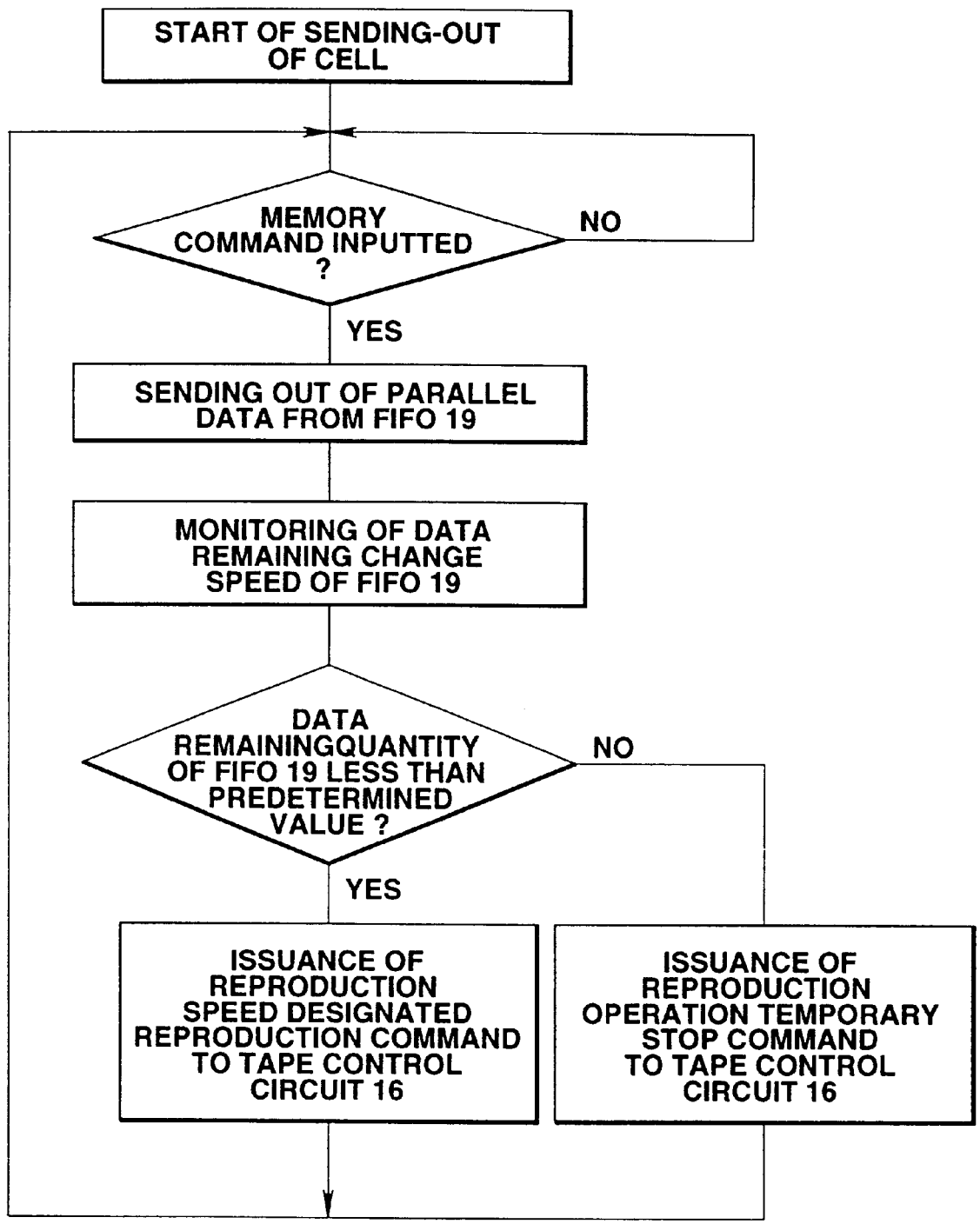
FIG. 3 is a flowchart showing transmitting system memory control of interface of the video material transmission system of FIG. 1.

In once recording digital video signal DV1 onto the magnetic tape to send out it to the transmission path 5 in a manner as stated above, the router 22 issues command to the memory control circuit 20 when it starts sending-out of cell so as to have ability of sequentially sending out cells in dependency upon the empty state of the transmission path 5 to hasten data input for generation of subsequent cells. As shown in FIG. 3, the memory control circuit 20 controls the FIFO 19 in response to the command. Thus, parallel data are sent out from the FIFO 19.

Thus, the router 22, the memory control circuit 20, the FIFO 19, and the serial encoder 21 temporarily hold reproduction data of the data recorder 6 to sequentially send out the reproduction data thus temporarily held in dependency upon empty state of the transmission path 5 every fundamental transfer units prescribed by B-ISDN.

In sending out reproduction data in this way, the memory control circuit 20 monitors data remaining quantity within the FIFO 19. When the data remaining quantity is less than the prescribed value, the memory control circuit 20 issues command of reproduction to the tape control circuit 16 of the data recorder 6. Moreover, the memory control circuit 20 monitors change speed of the data remaining quantity of the FIFO 19 to designate reproduction speed in correspondence with the change speed to issue reproduction command. On the contrary, when the data remaining quantity within the FIFO 19 is the prescribed value or more, the memory control circuit 20 issues temporary stop command of the reproduction operation to the tape control circuit 16.

Figure 4:
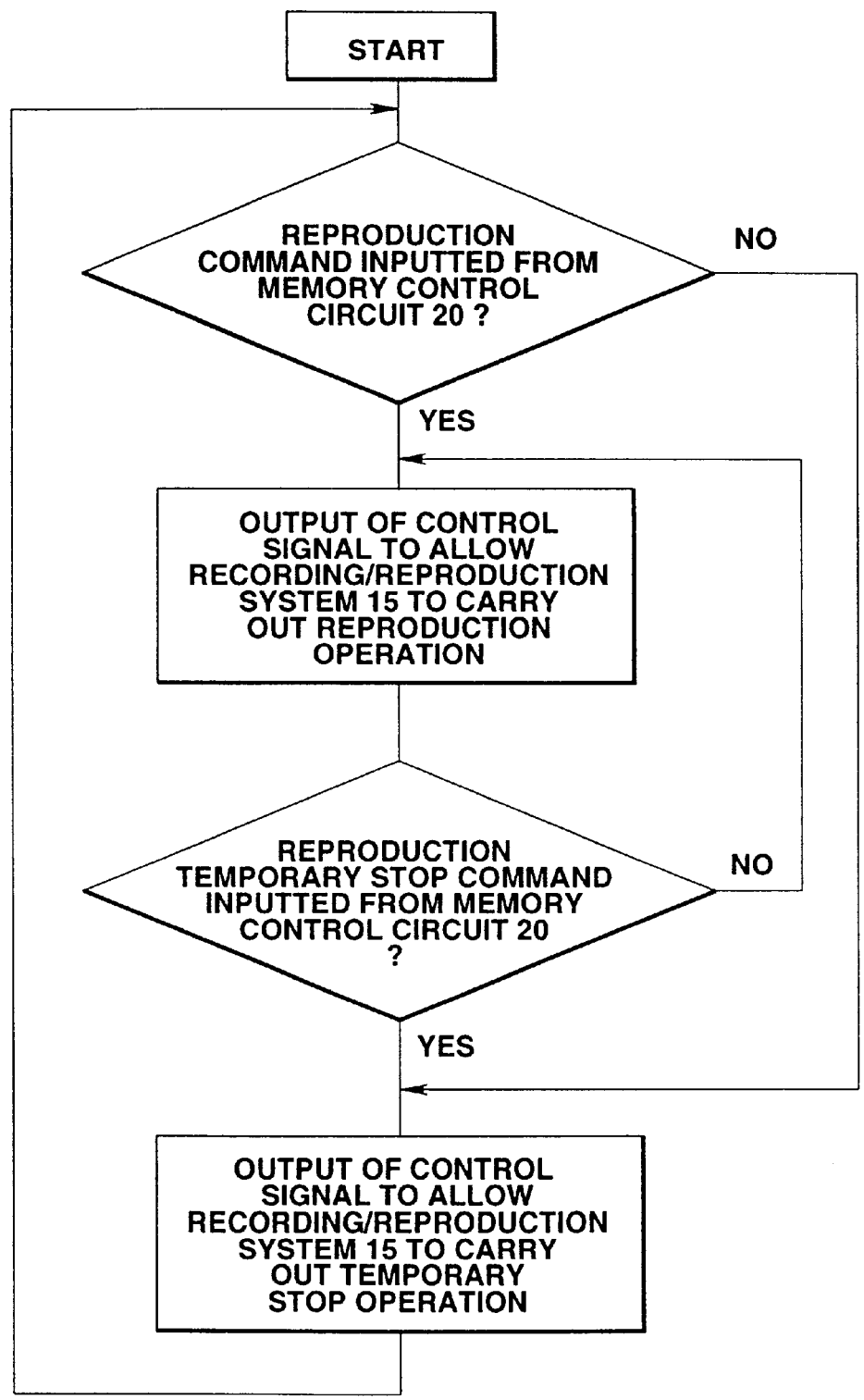
FIG. 4 is a flowchart showing transmitting system tape control of data recorder of the video material transmission system of FIG. 1.

When output of the digital video signal DV1 is started from the production system 2, the tape control circuit 16 switches the operation mode of the entirety of the data recorder 6 into the recording mode. Thus, this digital video signal DV1 is recorded onto the magnetic tape. Further, when this recording is completed, the tape control circuit 16 rewinds the magnetic tape thereafter to switch the entire operation mode into the reproduction mode. As shown in FIG. 4, the tape control circuit 16 switches the operation of the recording/reproduction system 15 in correspondence with control command outputted from the memory control circuit 20. Namely, the tape control circuit 16 is operative so that when reproduction command is inputted from the memory control circuit 20, it conducts a control to allow the recording/reproduction system 15 to carry out reproducing operation, while when temporary stop command of the reproducing operation is inputted from the memory control circuit 20, it conducts a control to allow the recording/reproduction system 15 to carry out temporary stop of the reproduction operation.

As described above, the memory control circuit 20 and the tape control circuit 16 control the reproducing operation of the magnetic tape so that data within a predetermined range is held within the FIFO 19. Thus, the video material transmission system 1 can intermittently send out picture data to the transmission path to send out, to the transmission object, video material by the digital video signal DV1 by the asynchronous transfer mode in accordance with the format prescribed by B-ISDN. Further, even in the case where the time interval of cell changes in dependency upon situations of the transmission path 5 so that data transfer rate (speed) of cell data is changed, and/or even in the case where data transfer rate (speed) of the transmission path 5 is greatly different from (with respect to) the data transfer rate (speed) of the digital video signal DV1, video material can be securely sent out.

Accordingly, in the production system 2, it is possible to send out video material by using B-SIDN line without relying on the SNG channel. As a result, the time required for carrying (transferring) video material is reduced accordingly. Thus, the working efficiency can be improved.

Figure 5:
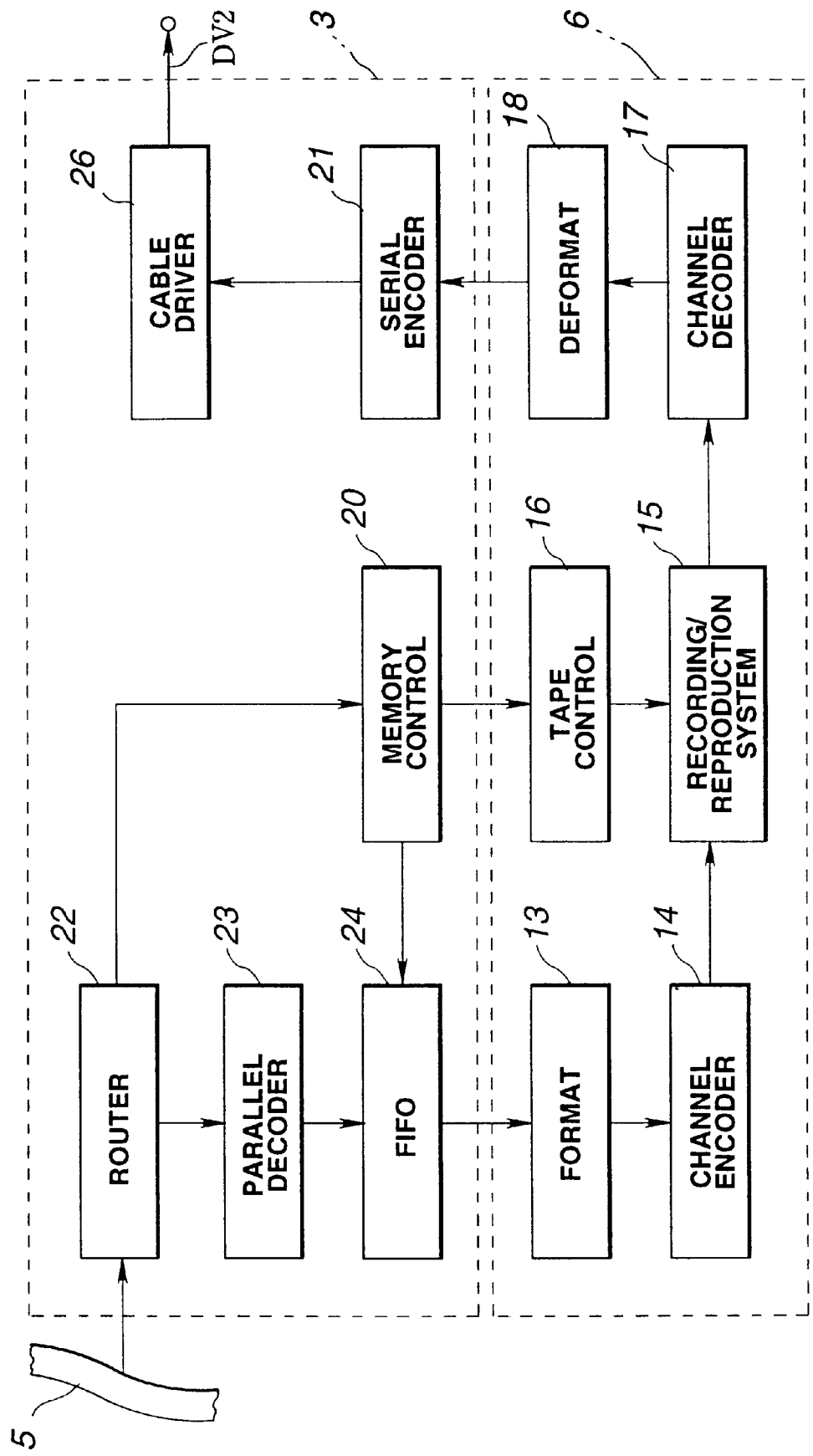
FIG. 5 is a block diagram showing receiving system of the video material transmission system of FIG. 1.

FIG. 5 is a block diagram showing the receiving system of the video material transmission system 1. In FIG. 5, corresponding reference numerals are respectively attached to the same components as those of the FIG. 2 mentioned above, and the descriptions overlapping with that of the components of FIG. 2 will be omitted.

In this receiving system, router 22 monitors headers of respective cells inputted through the transmission path 5 to selectively input the self designation cell. Further, the router 22 removes headers from the cells thus taken thereinto to carry out sequencing (rearrangement) thereof in order of cell number thereafter to output digital video signal to a parallel decoder 23 in the form of serial data. At this time, the router 22 simultaneously sends out data output notifying command to the memory control circuit 20.

The parallel decoder 23 converts the digital video signal in the form of serial data outputted from the router 22 into digital video signal in the form of parallel data to output it. A FIFO 24 forms buffer memory of the interface circuit 3 similarly to the FIFO 19 to store digital video signal outputted from the parallel decoder 23 to further output data stored at a predetermined timing to the recording system of the data recorder 6.

Figure 6:
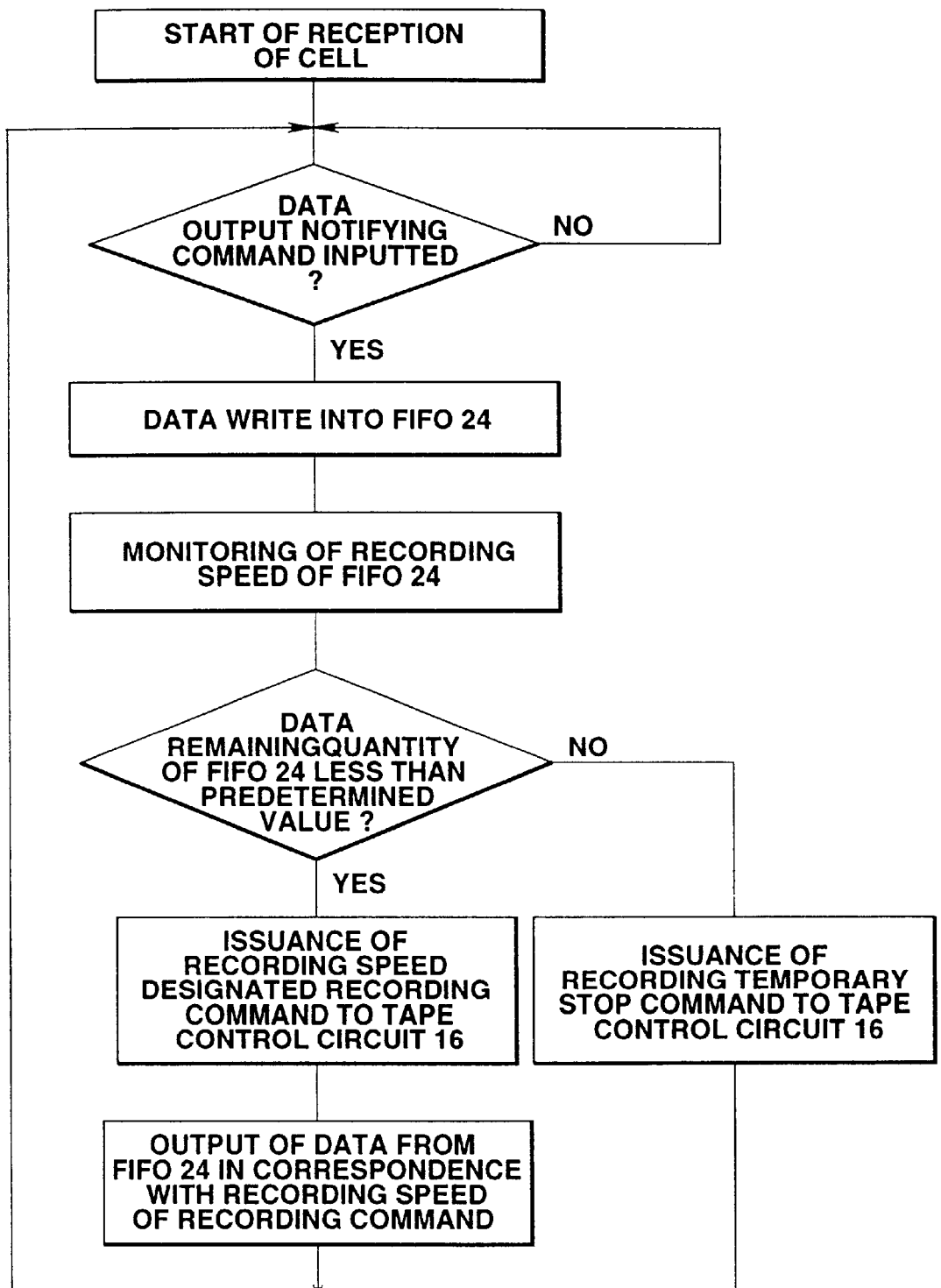
FIG. 6 is a flowchart showing receiving system memory control of interface of the video material transmission system of FIG. 1.

Thus, in the case where video material sent out from the transmission object is received, at the data recorder 6, in place of the digital video signal DV1 at the time of transmission (sending out), digital video signal in the form of parallel data outputted from the FIFO 24 is recorded onto the magnetic tape by recording/reproduction system 15. The memory control circuit 20 is operative so that in the case where it receives video material sent out from transmission object as shown in FIG. 6, the circuit 20 controls write operation of the FIFO 24 in accordance with command from the router 22 to thereby sequentially store data of cells intermittently inputted into the FIFO 24.

At this time, the memory control circuit 20 monitors data remaining quantity of the FIFO 24 to switch the operation of the FIFO 24 when the data remaining quantity is less than the prescribed value to thereby output parallel data stored in the FIFO 24 to the data recorder 6, and to issue command of recording to the tape control circuit 16. Further, at this time, the memory control circuit 20 monitors change speed of the data remaining quantity of the FIFO 24 to designate recording speed so as to correspond to the change speed to issue recording command, and to switch data read-out speed of the FIFO 24 so as to correspond to this recording speed. In contrast, when the data remaining quantity within the FIFO 24 is less than the prescribed value or more, the memory control circuit 20 issues temporary stop command of the recording operation to the tape control circuit 16.

Figure 7:
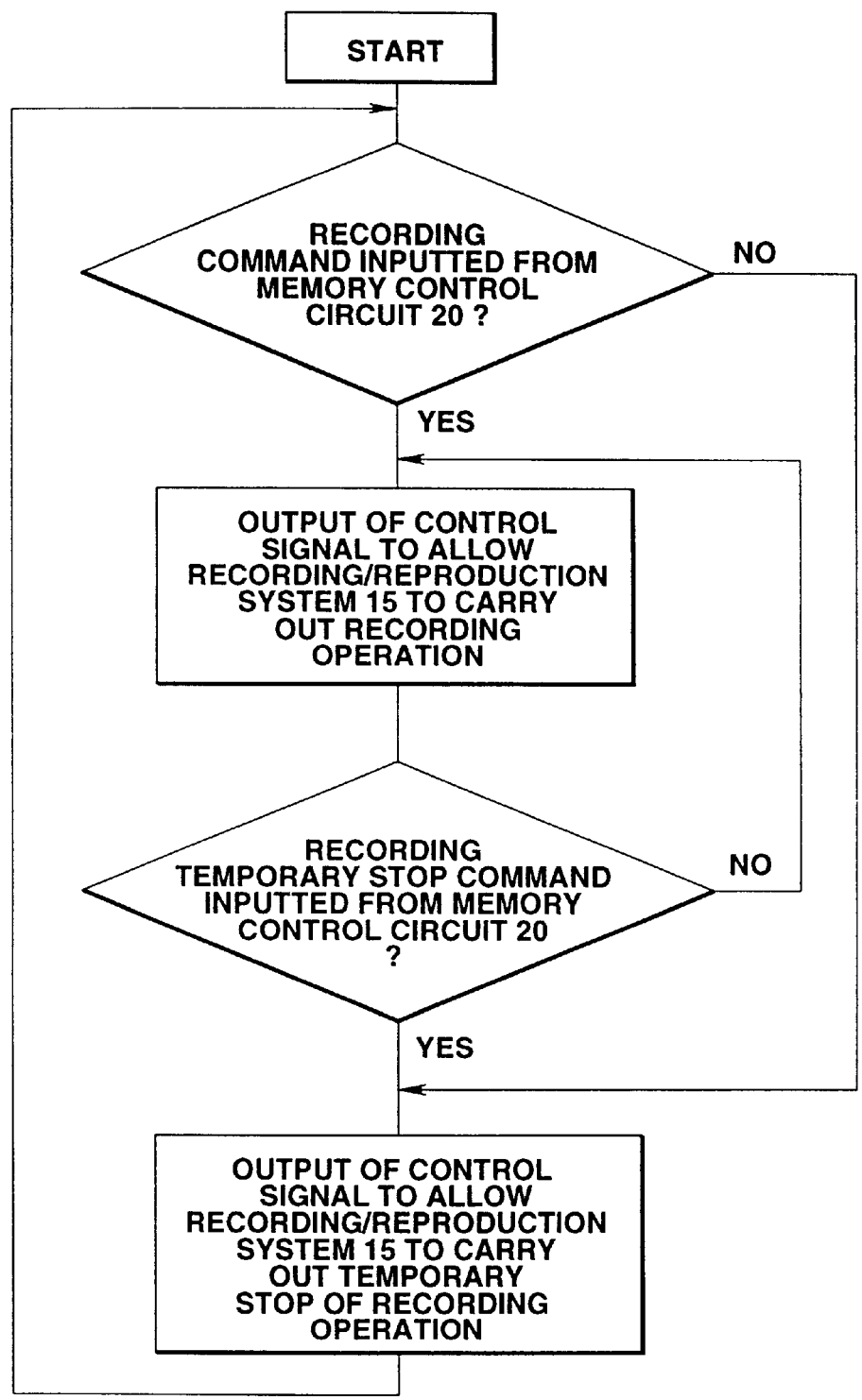
FIG. 7 is a flowchart showing receiving system tape control of data recorder of the video material transmission system of FIG. 1.
Figure 8:
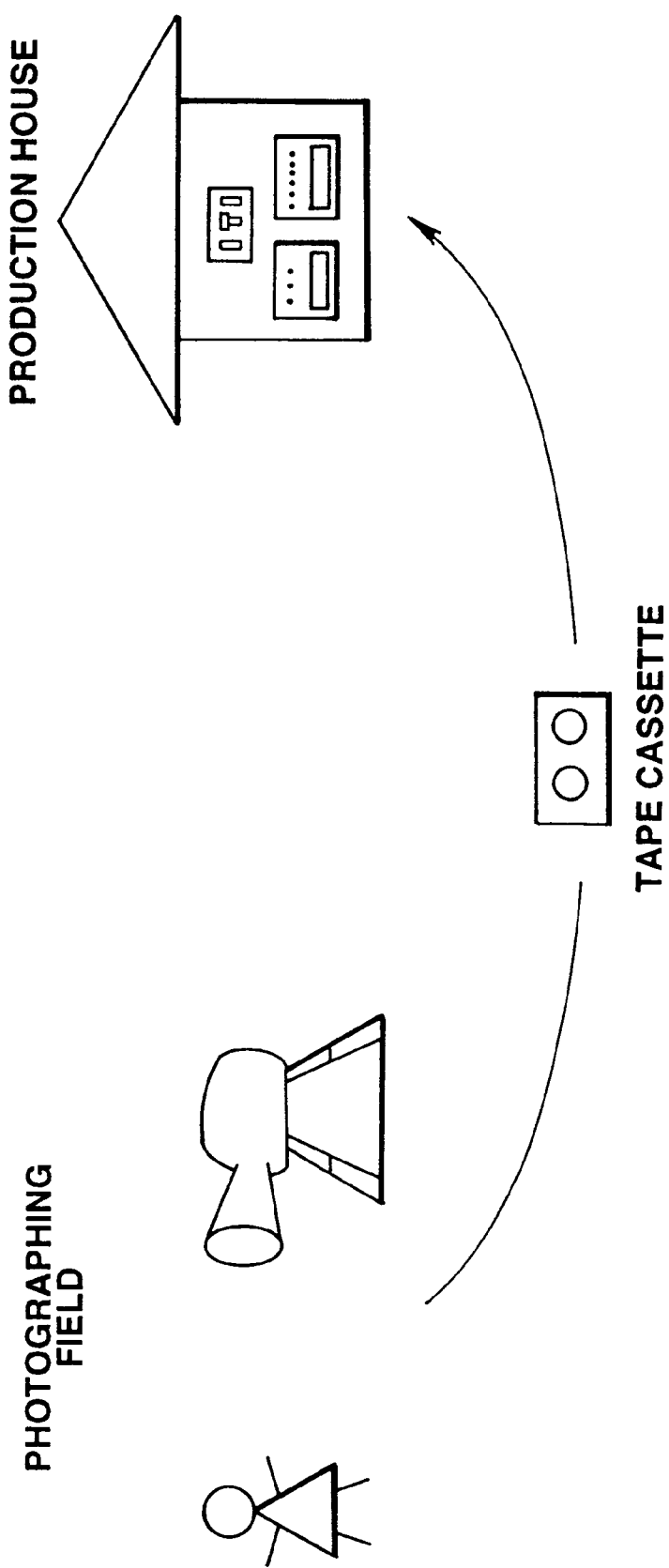
FIG. 8 is a schematic explanatory view showing conventional transfer means of video material.

The tape control circuit 16 is operative so that in the case where it receives video material sent out from the transmission object in this way, it switches the operation mode of the entirety of the data recorder 6 into the recording mode thereafter to switch the operation of the recording system in response to command outputted from the memory control circuit 20 as shown in FIG. 7 to thereby record parallel data outputted from the FIFO 24 onto the magnetic tape in accordance with the prescribed (specified) format. Further, the tape control circuit 16 rewinds the magnetic tape when a series of recording operations have been completed with respect to the video material sent out from the transmission object thereafter to switch the entire operation mode into the reproduction mode.

Thus, the video material transmission system 1 receives picture data caused to intermittently undergo transmission (transmitted) by the asynchronous transfer mode in accordance with the format prescribed by B-ISDN, and is caused to be placed in the state where it can receive digital video signal DV2 sent out from the transmission object. As this time, even in the case where the time interval of cell changes in dependency upon situations of the transmission path 5 so that the data transfer rate (speed) of cell data is changed, and/or even in the case where the data transfer rate (speed) of the transmission path 5 is greatly different from (with respect to) the data transfer rate (speed) of the digital video signal DV2, the video material transmission system 1 is adapted to have ability of securely receiving video material.

Since the video material transmission system is constructed as above, the serial encoder 21 of the interface circuit 3 is operative so that in the case where it receives video material sent out from the transmission object in a manner as described above, it directly inputs parallel data outputted from the data recorder 6 to convert such parallel data into digitals video signals DV2 prescribed (specified) by the SMPTE standard 259M to output them to a cable driver 26. The cable driver 26 outputs the digital video signals DV2 to the coaxial cable by the prescribed output impedance.

In the case where video material is sent to the transmission object in the above-described configuration, digital video signals DV1 forming this video material are inputted to the interface circuit 3 (FIG. 2). After the characteristic of each digital video signal DV1 is corrected at the equalizer 10, clock CK is extracted therefrom at the PLL circuit 11. Further, this digital video signal DV1 is converted into parallel data at the parallel decoder 12 of the succeeding stage. The parallel data thus obtained are outputted to the data recorder 6.

At this data recorder 6, the parallel data are caused to undergo the prescribed digital video signal processing through the format circuit 13 and the channel encoder 14. The parallel data thus processed are recorded onto the magnetic tape by the recording/reproduction system 15. Thus, a series of digital video signals DV1 forming this video material are once recorded onto the magnetic tape.

The digital video signals DV1 recorded on the magnetic tape are intermittently reproduced in accordance with empty state of the transmission path 5 by the asynchronous transfer mode with data remaining quantity of the FIFO 19 being as reference, and are reproduced at a reproduction speed corresponding to the transfer rate (speed) of data sent to the transmission path 5 with change speed of the data remaining quantity of the FIFO 19 being as reference. Thus, those reproduced digital video signals DV1 are inputted to the FIFO 19 through the channel decoder 17 and deformat circuit 18.

Further, the digital video signals DV1 inputted to the FIFO 19 are intermittently outputted at a predetermined timing in accordance with the empty state of the transmission path 5, and in accordance with the transfer rate (speed) of data sent to the transmission path 5 by the memory control circuit 20 controlled by the router 22. The digital video signals DV1 thus outputted are converted into serial data at the serial encoder 21. Thereafter, this serial data is converted, by the router 22, into cells prescribed by the B-ISDN. The cells thus obtained are outputted. Thus, video material is sent to the transmission object through the transmission path 5.

On the contrary, video material (FIG. 5) similarly transmitted in the form of cell from the transmission object through the transmission path 5 is caused to undergo, at the router 22, a processing such that corresponding cells are selectively taken in. Thereafter, data of the cells thus taken in are arranged (subjected to sequencing) in order of cell number. Those cells are converted into parallel data at the parallel decoder 23. The parallel data thus obtained are outputted to the data recorder 6 through the FIFO 24.

When outputted to the data recorder 6, digital video signals stored in the FIFO 24 are outputted intermittently and at a corresponding data transfer rate (speed) in the state where the data transfer rate (speed) is changed by the asynchronous transfer mode and in correspondence with data of cells intermittently inputted from the transmission path 5 with the data remaining quantity of the FIFO 24 and its change speed being as reference. The digital video signals thus outputted are recorded onto the magnetic tape by the recording/reproduction system 15.

When recorded onto the magnetic tape, these digital video signals DV2 are caused to similarly undergo intermittent recording operation such that recording operation and the temporary stop thereof are repeated at a data recording speed corresponding to data of cells intermittently inputted by the asynchronous transfer mode. When receiving operations of a series of the digital video signals DV2 forming the video material are completed, digital video signals DV2 recorded on the magnetic tape are reproduced and are outputted. Thus, it is possible to receive digital video signals DV2 transferred by the asynchronous transfer mode to output them by the synchronous transfer system.

In accordance with the above-mentioned configuration, an approach is employed to once record digital video signals DV1 by the data recorder thereafter to intermittently reproduce them in dependency upon situations of the transmission path, or an approach is employed to allow the data recorder to be intermittently operative to once record digital video signals inputted through the transmission path thereafter to reproduce those digital video signals to output them. Since such approaches are employed, it is possible to carry out transmission/reception of digital video signals based on the synchronous transfer system by using B-ISDN of the asynchronous transfer mode, or the basic line of B-ISDN greatly different in the transfer rate (speed). Thus, it is possible to carry out transmission of video material with ease by utilizing B-ISDN.

Further, since digital video signals are recorded and reproduced by the data recorder using magnetic tape, even in the case where data quantity of video material subject to transmission is great, and/or in the case where state of transmission by B-ISDN changes so that the transmission rate (speed) in which digital video signal is subjected to transmission/reception greatly changes, this video material transmission system can securely carry out transmission/reception of video material in a manner to cope with such changes.

It is to be noted that while, in the above-described embodiment, there has been described the case where digital video signals consisting of serial data of the prescribed format are subjected to transmission/reception to thereby carry out transmission/reception of the video material, this invention is not limited to such a case, but may be widely applied to the case where digital video signals consisting of parallel data are subjected to transmission/reception after undergone conversion into serial data, the case where video signals consisting of analog signals are subjected to transmission/reception after undergone conversion into digital signals, and the like. It is further to be noted that, in these cases, such a transmission system may be employed to convert various video signals into digital video signals of the format adapted to the above-described embodiment thereafter to carry out input/output thereof to and from the data recorder, or format conversion may be carried out between the recording/reproduction system constituting data recorder, etc. and the router.

Further, while, in the above-described embodiment, the case where video material is subjected to transmission/reception by the transmission path of the transmission rate (speed) of 155 [M bps] consisting of the basic line of B-ISDN has been described, this invention is not limited to such a case, but may be widely applied to the case where video materials are subjected to transmission/reception by B-ISDN of various transmission rates (speeds), and the case where video materials are subjected to transmission/reception by using various public lines, dedicated lines, or various communication paths by the asynchronous transfer mode such as local area network, etc. in addition to B-ISDN.

In addition, while, in the above-described embodiment, the case where magnetic tape is used as the video signal recording medium is used to once record digital video signals thereonto has been described, various video signal recording media for recording video material consisting of a series of video signals such as optical disc for recording digital video signals of the synchronous transfer system of this kind, etc. may be widely applied in place the above-mentioned magnetic tape in this invention.

Industrial Applicability

As described above, in accordance with this invention, such an approach is employed to once record a series of digital video signals onto the prescribed video signal recording medium thereafter to intermittently reproduce such digital video signals to send out them to the transmission path of the asynchronous transfer mode, or such an approach is employed to record, onto a recording medium, a series of data received from the transmission path of the asynchronous transfer mode to output them, thereby making it possible to carry out transmission of digital video signals of the synchronous transfer system by way of the transmission path of the asynchronous transfer mode such as B-ISDN, etc. Thus, video materials are subjected to transmission/reception through the transmission path of this kind to have ability of improving the working efficiency.

What is claimed is:

1. A video signal receiving apparatus for receiving picture data inputted in predetermined block units by an asynchronous transfer mode from a transmission path and for converting the received picture data as video material into a video signal or signals for transmission in a synchronous transfer mode, the apparatus comprising:

recording/reproduction means for recording or reproducing the video material with respect to a recording medium;

memory means for receiving the video material from the transmission path by the asynchronous transfer mode and for storing the received video material; and control means for monitoring memory speed of the video material to be stored into the memory means, and for monitoring remaining capacity of the memory means, such that when the remaining capacity of the memory means is less than a predetermined value when the video material is stored into the memory means from the transmission path, the control means outputs to the recording/reproduction means a control signal which designates recording speed of the recording/reproduction means and allows the memory means to output the video material stored therein to the recording/reproduction means in the synchronous transfer mode to record the video material.

2. A video signal receiving apparatus as set forth in claim 1,
wherein the video signal consists of a digital video signal of the prescribed format.

3. A video signal receiving apparatus as set forth in claim 1,
wherein the recording medium is comprised of magnetic tape.

4. A video signal receiving apparatus as set forth in claim 1,
wherein the video signal consists of a digital video signal of the prescribed format, and the recording medium is comprised of optical disc.

5. A video signal receiving apparatus as set forth in claim 1,
wherein the recording/reproduction means changes, on the basis of a control signal where recording speed is designated, which is outputted from the control means, the recording speed of the recording medium.

6. A video signal receiving method of receiving picture data inputted in predetermined block units by an asynchronous transfer mode from a transmission path and for converting the received picture data as video material into a video signal or signals in a synchronous transfer mode, the method comprising:

a first step of recording or reproducing the video material;

a second step of allowing memory means to receive the video material from the transmission path by the asynchronous transfer mode and storing the received video material; and a third step of monitoring memory speed of the video material to be stored into the memory means, and monitoring remaining capacity of the memory means, such that when the remaining capacity of the memory means is less than a predetermined value when the video material is stored into the memory means from the transmission path, such a control is conducted to allow the recording/reproduction means to record the video material received by the synchronous transfer mode onto the recording medium at a recording speed corresponding to the memory speed.

7. A video signal receiving method as set forth in claim 6,
wherein the video signal consists of a digital video signal of the prescribed format.

8. A video signal receiving method as set forth in claim 6,
wherein the recording medium is comprised of magnetic tape.

9. A video signal receiving method as set forth in claim 6,
wherein the video signal consists of a digital video signal of the prescribed format, and the recording medium is comprised of optical disc.

* * * * *